(12) United States Patent
Caldara et al.

(10) Patent No.: US 6,208,667 B1
(45) Date of Patent: Mar. 27, 2001

(54) CONSTANT PHASE CROSSBAR SWITCH

(75) Inventors: Stephen A. Caldara, Sudbury; Micheal A. Sluyski, Maynard, both of MA (US)

(73) Assignees: Fujitsu Network Communications, Richardson, TX (US); Fujitsu Limited, Kanagawa-ken (JP)

( * ) Notice: Subject to any disclaimer, the term of this patent is extended or adjusted under 35 U.S.C. 154(b) by 0 days.

(21) Appl. No.: 09/314,723

(22) Filed: May 18, 1999

Related U.S. Application Data

(63) Continuation of application No. PCT/US98/19562, filed on Sep. 18, 1998.
(60) Provisional application No. 60/059,531, filed on Sep. 19, 1997.

(51) Int. Cl.[7] ...................................................... H04J 3/06
(52) U.S. Cl. ........................... 370/503; 370/517; 375/377
(58) Field of Search .................................... 370/503, 517, 370/519, 516; 375/359, 371, 376, 362, 373–377

(56) References Cited

U.S. PATENT DOCUMENTS

| 4,977,582 | 12/1990 | Nichols et al. . |
|---|---|---|
| 5,022,056 | 6/1991 | Henerson et al. . |
| 5,509,037 | 4/1996 | Buckner et al. . |
| 5,675,580 | 10/1997 | Lyon et al. . |

Primary Examiner—Ajit Patel
(74) Attorney, Agent, or Firm—Weingarten, Schurgin, Gagnebin & Hayes LLP

(57) ABSTRACT

A constant phase crossbar switch system which avoids phase discontinuities at the outputs of the crossbar switch. The crossbar switch system includes input logic, a crossbar switch, output logic and a phase locked loop. The phase locked loop is used to generate a high speed internal clock from a system clock. High speed serial data streams transmitted at the internal clock frequency are received from corresponding transmitters and are coupled to the input logic. The input logic generates multiple versions of each serial data stream, one of the versions being undelayed and the other versions delayed by some fraction of a bit time. State machines are employed to selects the version of the serial data stream which results in the data stream data window being generally centered with respect to the high speed internal clock. The selected version of the data stream is employed as the active input to the crossbar switch. The selected version of each of the data stream is clocked into an output register which is clocked by the internal clock. The selection of the phase delayed version of the serial data stream in the described manner avoids phase discontinuities upon switching of sourcing transmitters.

9 Claims, 6 Drawing Sheets

CONSTANT PHASE CROSSBAR SWITCH

CROSS REFERENCE TO RELATED APPLICATIONS

This is a continuation of International Application PCT/US98/19562, with an international filing date of Sep. 18, 1998, which claims priority to U.S. Provisional Application No. 60/059,531 filed Sep. 19, 1997.

The present application claims priority of U.S. Provisional Application No. 60/059,531 titled CONSTANT PHASE CROSSBAR SWITCH and filed Sep. 19, 1997.

STATEMENT REGARDING FEDERALLY SPONSORED RESEARCH OR DEVELOPMENT

Not Applicable

BACKGROUND OF THE INVENTION

The present invention relates to high speed telecommunications network switches and more particularly to a constant phase crossbar switch which compensates for phase inconsistencies in switched high speed data streams.

In a telecommunications device, such as a network switch, data units are received at input modules which are typically coupled to corresponding inputs of a switch matrix, otherwise referred to as a crossconnect, a crossbar or a crosspoint switch. The received data units are forwarded from the respective inputs of the crossbar switch to one or more output modules coupled to corresponding output modules of the crossbar switch. In a typical network switch, the input and output modules are disposed on printed circuit boards and the crossbar switch is likewise disposed on one or more circuit boards. The input/output modules and the crossbar switch are typically interconnected via a backplane.

It is known that the communication between the respective input and output modules and the crosspoint switch may be via parallel or links or serial links. Each approach poses its own unique problems in the design of a high speed network switch. It is well recognized that the use of parallel links between the input modules and the crossbar switch and the output module and the crossbar switch has the advantage of significantly reducing the data rate of the data stream through the switch thereby simplifying electrical design. For example to transfer one gigabit per second of data requires a one GHz clock if a serial data stream is used versus approximately a 31.25 MHz clock if the crossbar switch operates on a 32 bit wide parallel data stream. However, when the input and output modules are coupled to the crossbar switch using a wide parallel link or bus, a large number of interconnects must be accommodated. For example, in a 16 input port by 16 output port network switch, assuming single ended drivers and receivers and 32 bit wide parallel links per port, 512 interconnects would be required just for the parallel data links. If differential drivers and receivers are employed on the links, the number of interconnects would double. Such a design approach necessitates a large number of interconnects, has a potential effect on reliability of the system due tootle need to run large numbers of signal paths through connectors, and greatly complicates board layout and design.

The desire to achieve high aggregate data transfer rates in a small form factor thus favors the use of serial interconnects between the input modules and the crossbar switch and the crossbar switch and the output modules. The serial data stream approach minimizes the interconnect cost for a given system bandwidth and conversely, maximizes the system bandwidth for a given interconnect cost.

In a typical network switch employing a serial interconnect to a crossbar, a transmitter within the input module transmits a serial data stream over a link to an input of the crossbar switch and the crossbar transmits the serial data stream through one or more outputs to a receiver disposed on an output module. The transmitter comprises a high speed parallel to serial converter. Parallel data is strobed into the transmitter. The transmitter serializes the data and transmits the data as a high speed serial data stream to a corresponding input of the crossbar switch. Typically, one transmitter per port is coupled via a serial interconnect to a corresponding input of a N×N crossbar switch.

A crossbar switch has the characteristics of being able to effectively couple the data stream appearing at any specified one of the crossbar switch inputs to one or more of the crossbar switch outputs. The crossbar switch may not couple data streams appearing on any two inputs of the crossbar switch to any single output of the crossbar switch at any given time. One implementation of a crossbar switch known in the art comprises a set of cascaded multiplexers which are configured to allow any input to be connected to any one or more outputs of the crossbar switch subject to the above referenced constraint.

The receiver is essentially the inverse of the transmitter. The receiver receives the high speed serial data stream from the crossbar switch and deserializes the data to produce parallel data at its output.

At high serial transfer rates, it becomes impractical to recover the data at the receiver using a distributed clock source. The distribution of clock and data over separate interconnects undesirably adds to the number of interconnects. The minimum number of interconnects, and thus the highest density system, is achieved by encoding clock and data over a one bit wide serial interconnect. Since the serial data stream in such a circumstance carries both clock and data, the receiver must regenerate the clock in order to recover the transmitted data. Phase locked loops (PLLs) have been commonly employed in the receiver to accomplish this function.

In a system employing high speed serial transmission through a crossbar switch at one point in time a first transmitter may be sourcing a serial data stream to a particular receiver and following a switching event at the crossbar switch, a second transmitter may be sourcing a different high speed serial data stream to the same receiver. The serial data streams may be clocked at data rates of over one gigabit per second. At such data rates, phase discontinuities between the respective data streams appear at the inputs of the respective receivers at crossbar switching events due to variations in the printed circuit path lengths for the various circuits, different propagation delays as well as other reasons. It is impractical to tune the delays during the design process such that the delay time from a transmitter through the crossbar switch is constant or predictable. As a result, when the crossbar switch changes the transmitter that a given receiver is connected to, a phase discontinuity in the serial bit data stream is often seen by the receiver. The phase discontinuity causes the receiver to lose synchronization of the bit stream. After some period of time, the phase locked loop associated with the respective receiver will reacquire lock on the new data stream such that it can reliably reclock and recover the data. The extended time period to reacquire lock lowers the effective bandwidth of the system since data cannot be transmitted during this interval.

More specifically, in one high-speed telecommunications network switch implemented by the present assignee, a one gigabit serial data stream comprising a preamble, a sync field, a data field and a postamble is switched through a crossbar switch. The preamble comprises 60 alternating ones and zeros, the sync field comprises a predetermined 10 bit code defining the start of the data field, the data field contains 560 data bits and the postamble contains 10 bits which are employed in conjunction with an 8B/10B encoding technique to maintain DC balance of the transmitted data stream. The receiver must thus reacquire lock on the data stream within the period afforded by the 60 bit preamble if lock is lost following a crossbar switching event in which a different transmitter is coupled to a particular receiver.

It is extremely difficult to construct a phase locked loop which can reacquire lock within 60 bit times at 1 gigabit per second or higher data rates. Various alternatives are routinely considered. First, the percentage of the specified cycle for clock synchronization may be increased; i.e. the length of the preamble may be increased and the length of the data field may be correspondingly decreased. This approach allows a greater number of bits for the receiver to achieve lock, however, it undesirably reduces the percentage of the available cycle that is available to carry the payload. Alternatively, the length of the preamble may be increased to provide a sufficient length bit stream for the receiver to reacquire lock after a switching event and, at the same time, the number of bits in the payload may be increased such that the percentage of the preamble bit length to the overall bit length for the cycle has not changed. This approach results in a reduction in the frequency of switching events through the crossbar switch which renders the switch less efficient in handling incoming traffic.

Another approach which has been utilized involves the duplication of receivers and transmitters on both sides of the crossbar switch. More specifically, a transmitter is employed to encode and serialize the data stream and to forward the serial data over an interconnect on the backplane for receipt by the crossbar switch. A receiver having a phase locked loop is located prior to the input to the crossbar switch and is employed to recover the clock and to deserialize the data. The parallel data is then switched through the crossbar switch at a reduced clock rate. At each output of the crossbar switch, the parallel data is coupled to a transmitter which encodes the data for serial transmission over a link for receipt by a receiver located on an output module. A phase locked loop associated with the receiver is employed to recover the clock and data transmitted by the respective transmitter at the output of the crossbar switch. This approach avoids the problems associated with phase discontinuities at switching events at the expense of an increased number of transmitters and receivers and a more complex crossbar switch.

It would therefore be desirable to be able to employ a high speed serial technique for transmission of data through a crossbar switch while avoiding the problems associated with phase discontinuities at switching events.

BRIEF SUMMARY OF THE INVENTION

In accordance with the present invention a constant phase crossbar switching system is disclosed which substantially eliminates phase discontinuities at the input of a receiver downstream of a crossbar switch when the crossbar switch decouples a first transmitter sourcing a first high speed data stream and instead couples a second transmitter sourcing a second high speed data stream to the receiver via the crossbar switch. As a result, the receiver remains locked to the data stream even through the sourcing transmitter has changed. The time period during which no data transfer can take place is significantly reduced or eliminated utilizing the presently disclosed constant phase crossbar switching system. As a consequence a higher aggregate system bandwidth may be achieved.

The presently disclosed crossbar switching system comprises input logic associated with each input of the crossbar switch, a crossbar switch, output logic and a phase locked loop. The phase locked loop receives a reference clock and multiplies the reference clock to generate an internal clock that runs at the same frequency as the high speed serial bit stream sourced by respective transmitters. The reference clock comprises the same clock that is employed to clock the receivers and the transmitters. The internal clock is also employed to clock the crossbar switch. The crossbar performs the functions of interconnecting the input data streams from the respective input logic blocks to one or more outputs. The output logic circuits are each coupled to an output of the crossbar switch. Each output logic circuit comprises an output register and an output driver. The output registers are also clocked using the high speed internal clock generated by the phase locked loop.

The input logic consists of an input buffer, a multitap delay line, input registers, phase checking state machines and phase selection logic. The input logic serves to adjust the phase of the incoming serial data stream with respect to the high speed internal clock. More specifically, multiple copies of the incoming serial data stream are created and each copy is delayed by some additional fraction of a bit time. During an alignment phase, a predetermined serial pattern is transmitted as the serial bit stream. One state machine examines each of the delayed serial data streams for the predetermined pattern being transmitted and outputs a signal to the phase selection logic indicating whether the respective state machine properly detected the predetermined pattern. The selection logic analyzes the signals from each of the state machines and selects one of the delayed copies of the input signal as the signal to be applied to the crossconnect switch. The selection signal selects one of the delayed versions of the input signal such that the data window is centered with respect to the high speed internal clock. One state machine may be employed for each delayed version of the input signals or alternatively, a single state machine may be employed which is multiplexed across each delayed copy of the input signal. Additionally, a single state machine may optionally be multiplexed across all registers within the crossbar switch system.

Following the alignment phase the receiver tracks the serial data stream and need not reacquire lock on each successive cycle as a consequence of switching events. Lower system error rates and a high effective aggregate system bandwidth are thereby achieved.

BRIEF DESCRIPTION OF THE SEVERAL VIEWS OF THE DRAWING

The invention will be more fully understood by reference to the following Detailed Description of the Invention in conjunction with the following drawings of which.

DETAILED DESCRIPTION OF THE INVENTION

Figure 1:
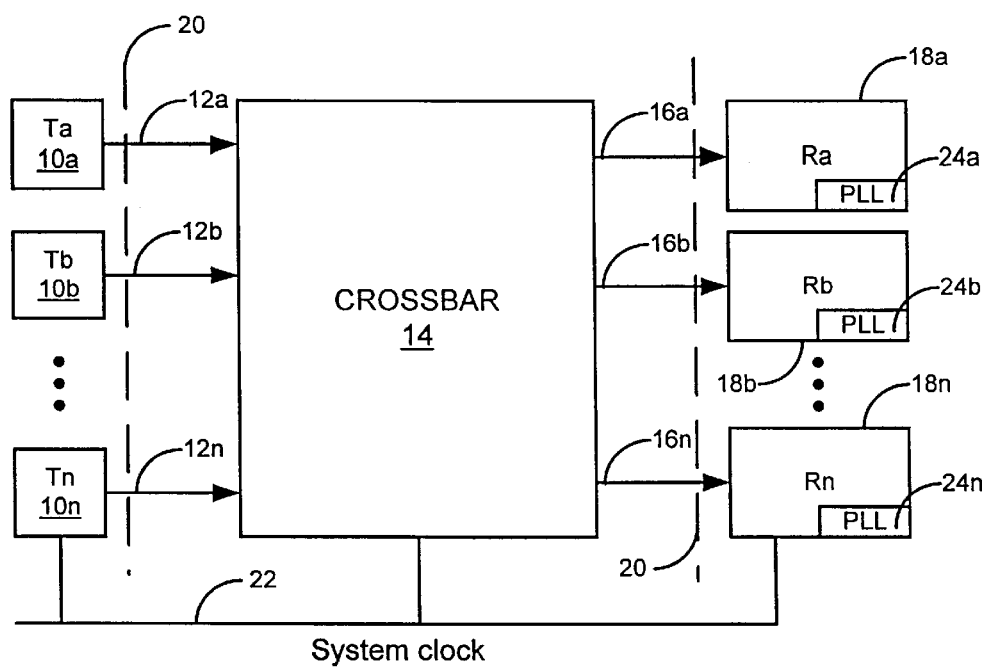
FIG. 1 is a block diagram of a Prior Art switching system comprising a plurality of transmitters, a crossbar switch and a plurality of receivers.

A simplified block diagram of a portion of a Prior Art Asynchronous Transfer Mode network switch developed by the Assignee of the present invention is depicted in FIG. 1. The network switch includes a plurality of transmitters Ta through Tn (designated 10a through 10n) coupled via respective high speed serial data links 12a through 12n to corresponding inputs of a crossbar switch 14. Outputs of the crossbar switch 14 are coupled over serial communication links 16a through 16n to inputs of corresponding receivers 18a through 18n. In one network switch developed by the present Assignee and known as the NEXEN 8000 the transmitters Ta through Tn (10a through 10n) and the receivers Ra through Rn (18a through 18n) are disposed on input/output modules and are coupled to the crossbar 14 via a backplane generally designated 20. High speed serial links are employed between the transmitters and the crossbar and between the crossbar and the receivers to efficiently transfer data while minimizing interconnects across the backplane 20. The NEXEN 8000 referenced above is a synchronous system in which each input/output module operates in lock step with all other input/output modules within the system. The system clock 22 operates at approximately 50 Mhz and is multiplied to generate an internal serial data clock which runs at a frequency of approximately 1 Ghz. Serial data is clocked across the communication links 12a–12n and 16a–16n at the internal clock rate of approximately 1 Ghz.

Figure 2:
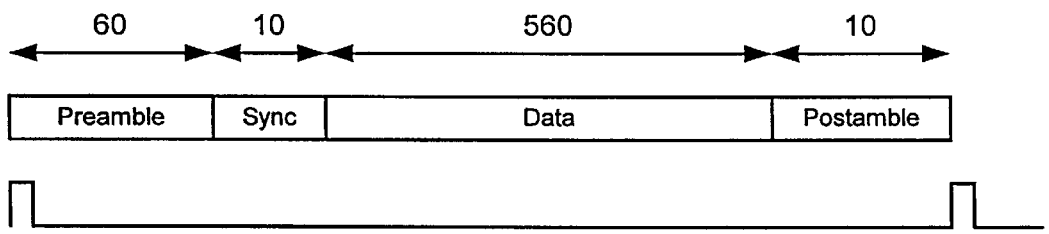
FIG. 2 is a block diagram illustrating the format of a Prior Art serial data stream.

Every 32 clock cycles, each transmitter having data to transmit transfers one ATM cell through the crossbar switch 14. The cell format is depicted in FIG. 2. The cell comprises a 60 bit preamble constituting an alternating 01010 . . . 1 pattern, a 10 bit sync field comprising a framing sequence (0011111010) which is employed to identify the beginning of the data field, a 560 bit data field, and 10 bit postamble. The data is protected with a cyclic redundancy check (CRC). The preamble is intended to allow the respective receiver 18a–18n to reacquire lock using phase locked loops 24a–24n associated with respective receivers 18a–18n within the period provided by the sixty bit preamble. It is expected that the relevant receiver is locked to the serial data stream by the time the Sync signal arrives. The data is transmitted over the serial links, as indicated above, at a 1 gigabit per second data rate. The data is NRZ encoded and DC balanced using an 8B/10B encoding technique. At this data rate, no attempt is made to tune the system to equalize path delays through the switch, because phase offsets due to differences in printed circuit board etch lengths and component process variations make such tuning impractical. Consequently, using the Prior Art technique, the receivers Ra through Rn (18a–18n) cannot be assured to acquire phase lock under all conditions within the 60 bit times allocated. More specifically, each time the crossbar 14 is reconfigured, the receiver sees a phase step when a different transmitter is connected to the input of a given receiver via the crossbar switch since the serial data streams are typically not phase aligned. Depending on the magnitude of the phase step and the ability of the respective PLL 24 to resolve the offset and slew to the new phase, statistically significant cell error rates may be experienced.

Figure 3:
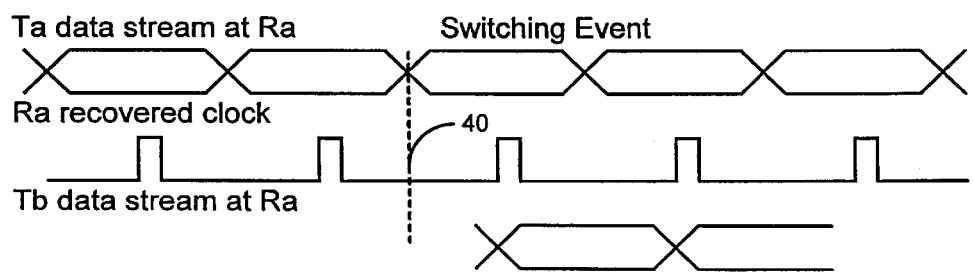
FIG. 3 is a timing diagram illustrating a phase discontinuity as seen by a receiver following a switching event in which the transmitter sourcing data to a particular receiver is changed.

The problem is further illustrated in the timing diagram of FIG. 3. The upper waveform illustrates the data stream data window at receiver Ra (18a) after the phase locked loop 24a at the receiver Ra has acquired lock. As illustrated, the recovered clock (center waveform) is generally centrally disposed within the data window for the data stream transmitted by the transmitter Ta (10a). A switching event is depicted as occurring in FIG. 3 at the time 40. Prior to time 40 it is assumed that transmitter Ta was sourcing a high speed data stream to receiver Ra and after the switching event at the time 40 it is assumed that transmitter Tb is sourcing a high speed data stream to receiver Ra via the crossbar switch 14. As a consequence of phase misalignment between the data streams sourced by transmitters Ta and Tb for the reasons discussed above, there is a phase step between these data streams. Accordingly, the recovered clock at receiver Ra 18a is not centered on the data stream sourced by transmitter Tb 10b. Rather, the recovered clock at the receiver Ra 18a generated by the phase locked loop 24a occurs just after the switching event at time 40 at the data transition time for the data stream sourced by the transmitter Tb 10b. Consequently, errors may result if the phase locked loop 24a within the receiver Ra 18a cannot acquire lock on the data stream sourced by the transmitter Tb 10b within the time period afforded by the 60 bit preamble depicted in FIG. 2.

Figure 4:
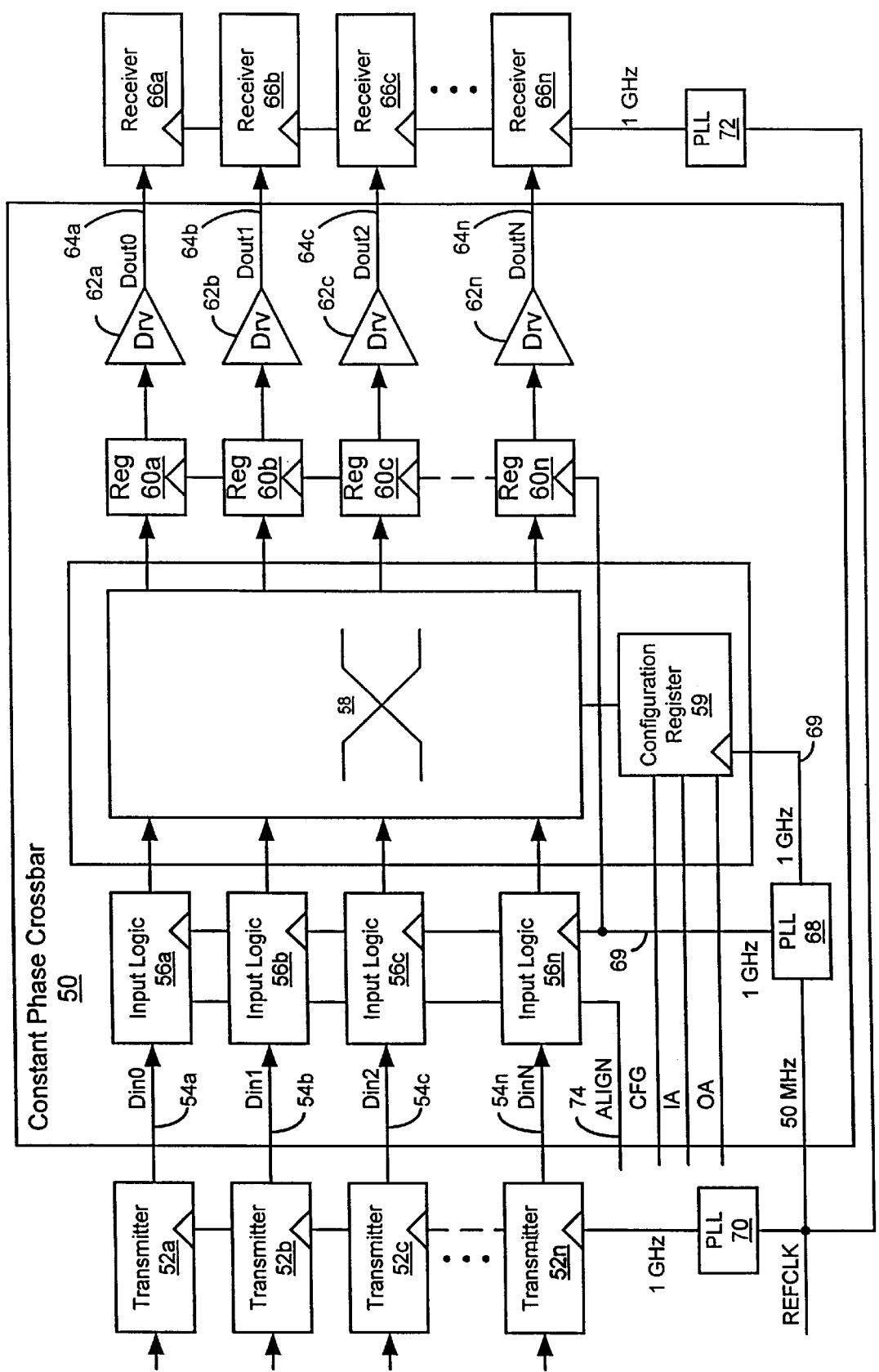
FIG. 4 is a block diagram of a constant phase crossbar system in accordance with the present invention.

To avoid errors introduced as a consequence of the above described phase discontinuities associated with the coupling of a new transmitter source to a receiver via the crossbar switch 14, a constant phase crossbar system is employed which allows phase lock to be retained on the serial data stream at each receiver even though the sourcing transmitter has been switched. Referring to FIG. 4, the constant phase crossbar system generally includes a plurality of input logic circuits, a crossbar switch, a plurality of output logic circuits and a phase locked loop. These elements are described with greater particularity below.

The constant phase crossbar system 50 receives a plurality of serial data streams from a corresponding plurality of transmitters Ta through Tn (52a through 52n) over serial communication links 54a through 54n. The serial data streams are coupled to input logic circuits 56a through 56n. The output of each of the input logic circuits is coupled to a corresponding input of the crossbar switch 58, such as a crossbar switch identified as model number TQ8017 which is commercially available from Triquint Semiconductor, Inc. of Hillsboro, Oreg. The crossbar switch 58 includes a configuration register 59 which specifies the data to be employed in determining the connections of current crossbar switch inputs to outputs and the next connections of crossbar switch inputs to outputs. Typically, crossbar configuration registers identifying the connections for the next switching state are loaded in advance and changed substantially simultaneously in response to a control signal. The crossbar switch 58 has a plurality of outputs which are coupled to inputs of the corresponding output registers 60a through 60n. The output registers are clocked with the high speed internal clock 69 and may comprise D flip flops or any other suitable clocked storage elements. The output registers 60*a* through 60*n* have corresponding outputs which are coupled to inputs of drivers 62*a* through 62*n*, respectively. The drivers 62*a* through 62*n* drive serial data over links at high speed across a backplane interconnect for receipt by corresponding receivers Ra through Rn (66*a* through 66*n*).

A reference clock (REFCLK) is input to the phase locked loop (PLL) 68 and the phase locked loop 68 is used to generate an internal clock that runs at the same frequency as the serial bit stream transmitted by the transmitters Ta through Tn 52*a* through 52*n*. The REFCLK is also coupled to the transmitters Ta through Tn 52*a* through 52*n* and the receivers Ra through Rn 66*a* through 66*n*. In the illustrated embodiment, the reference clock runs at a frequency of approximately 50 Mhz. The PLL 68 multiplies the reference clock to generate a frequency which matches the data rate of the serial bit stream transmitted over the serial links 54*a* through 54*n*. In the illustrated embodiment the PLL 68 multiples the REFCLK to generate a high speed internal clock 69 which runs at a frequency of approximately 1 GHz. The high speed internal clock 69 is also provided to the crossbar switch 58.

The crossbar switch 58 performs the function of interconnecting selected inputs to one or more of the outputs of the crossbar switch. The crossbar switch 58 may comprise a flow-through crossconnect in the form of cascaded multiplexers. Alternatively, at high data rates, the crossconnect may employ registers internal to the crossbar to pipeline the data transfer. The internal registers may be clocked using the internal clock 69 generated via the phase locked loop 68 to maintain synchronism of the crossbar switch 58 with both the input logic circuits 56*a* through 56*n* and the output registers 60*a* through 60*n*.

Figure 5:
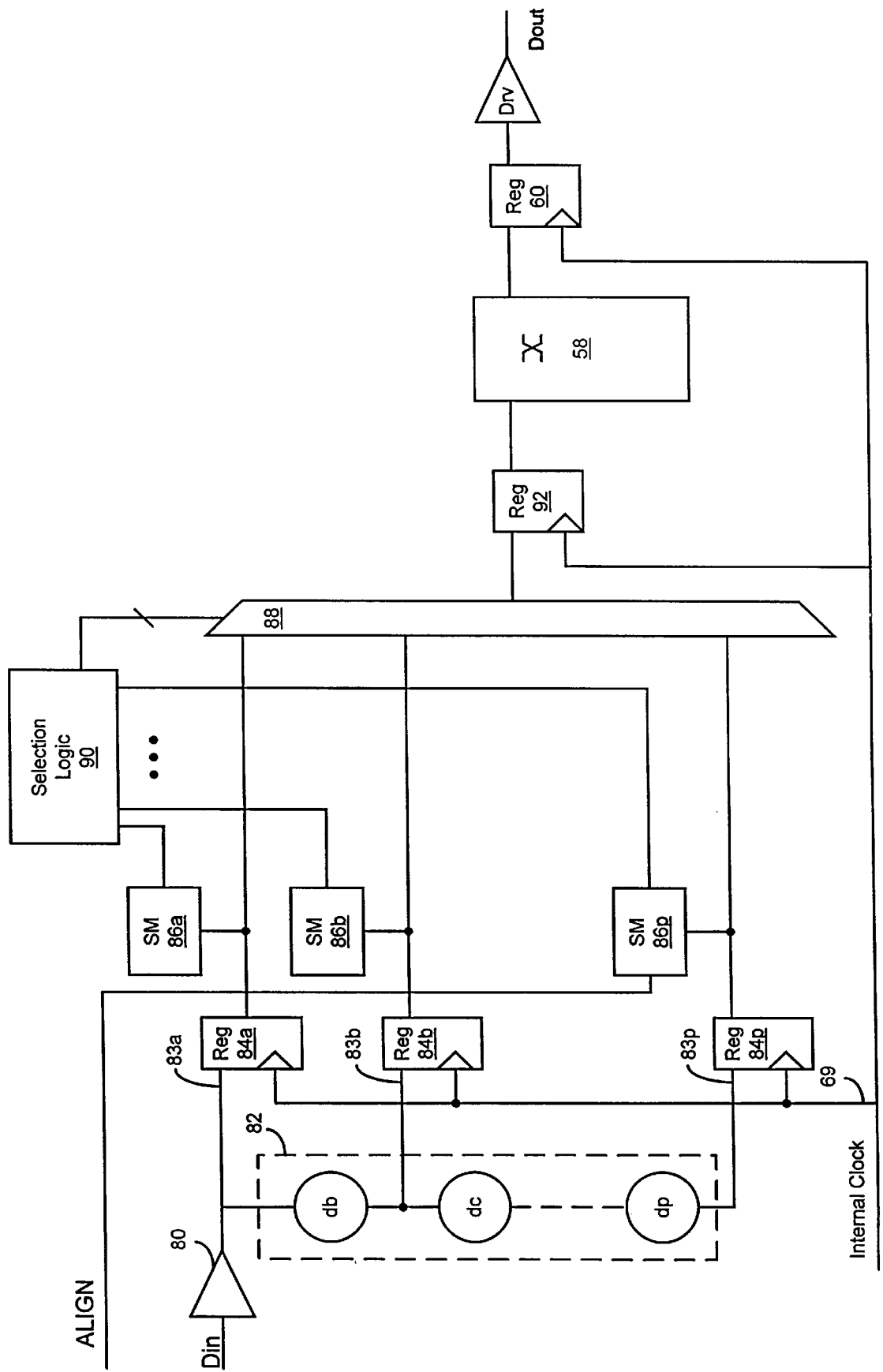
FIG. 5 is a more detailed block diagram of the input logic of FIG. 4.
Figure 6:
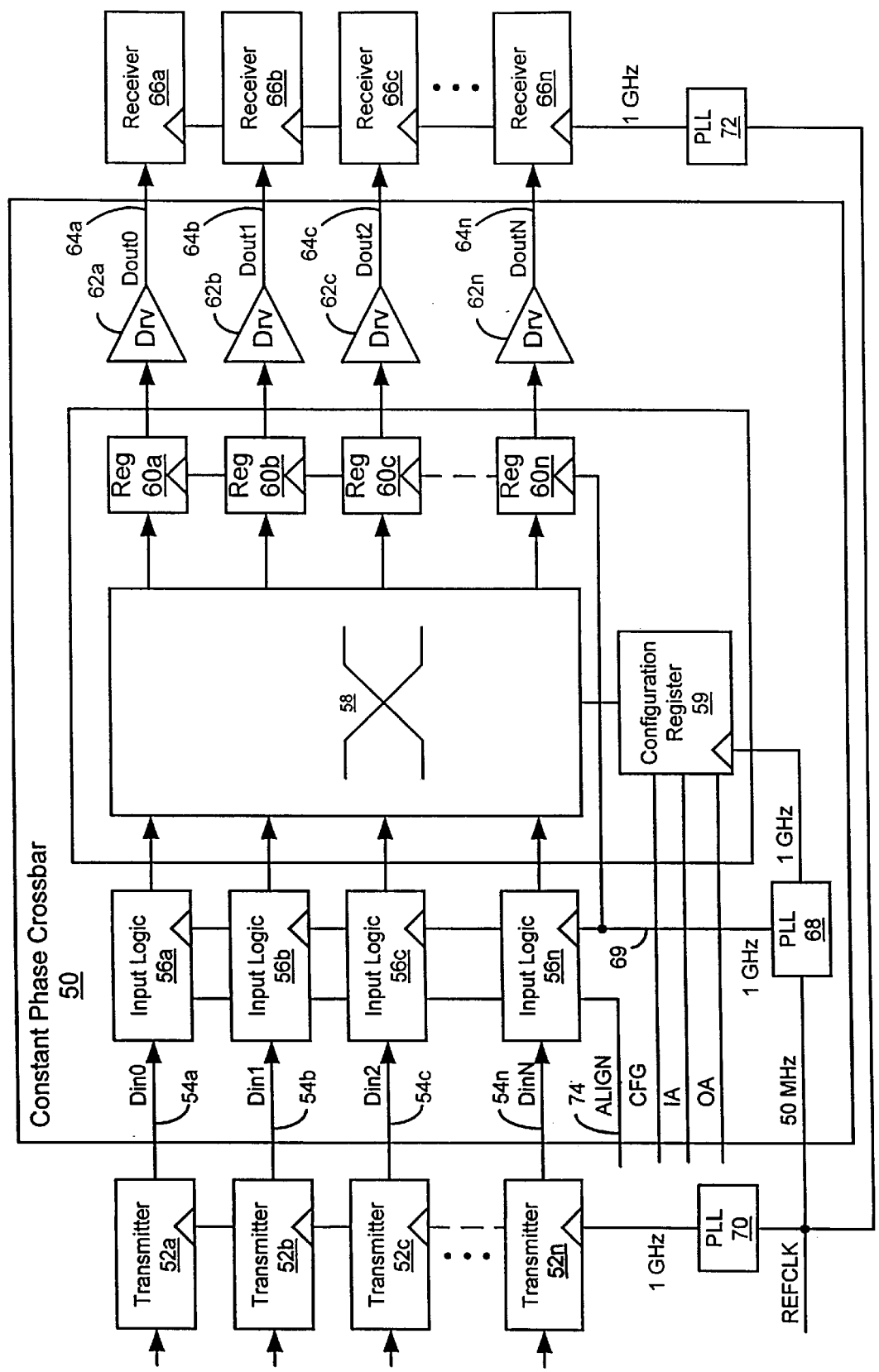
FIG. 6 is a variation of the block diagram of the constant phase crossbar system of FIG. 4 in which output registers are illustrated as being integrated within the same application specific integrated circuit as the crossbar.

The input logic circuits 56*a* through 56*n* are depicted in greater detail in FIG. 5. Referring to FIG. 5, each one of the input blocks consists of an input buffer 80, a multitap delay line 82, a plurality of registers 84*a* through 84*p*, a plurality of phase checking state machines 86*a* through 86*p* corresponding in number to the number of registers 84, and phase selection logic 88. The input registers may comprise a D flip-flop or any other suitable clocked storage element. The function of the input block is to re-time the data input with respect to the high speed internal clock. This is accomplished by creating multiple copies of the received high speed serial input stream where each copy is delayed by some additional fraction of a bit-time. More specifically, referring to the data stream transmitted by the transmitter Ta 52*a* for purposes of illustration, the data stream is transmitted over serial link 54*a* and is buffered by a buffer 80 within the input logic 56*a*. The output of the buffer 80 is coupled to the input of the delay line 82. The delay line 82 has multiple signal taps 83*a* through 83*p* which are coupled to respective inputs of registers 84*a* through 84*p*. As illustrated, the signal tap 83*a* is not delayed and each subsequent signal tap of delay line is delayed by an increasing fraction of a bit time represented as incremental delays db, dc, . . . dp. The data streams appearing at the respective signal taps 83*a* through 83*p* are synchronously clocked into the respective registers 84*a* through 84*p* using the high speed internal clock 69.

The outputs of the input registers 84*a* through 84*p* are coupled to corresponding state machines 86*a* through 86*p* and additionally, the output of each of the registers 86*a* through 86*p* is coupled to a multiplexer 88. Additionally, each of the state machines produces an output signal which is coupled to selection logic 90 which is described in further detail below.

During an alignment phase which is activated by the assertion of the ALIGN signal depicted in FIG. 4 under system control, the transmitters Ta through Tn transmit a predetermined data pattern over the serial links 54*a* through 54*n*, respectively. One such pattern may be an alternating patter of 0s and 1s. The respective state machines 86*a* through 86*p* examine each of the delayed data streams for the specific predetermined data pattern to ascertain whether the pattern was correctly received. Each state machine produces an output signal which indicates whether or not the respective delayed version of the high speed data stream was accurately detected by the state machine. Since the data streams are phase delayed with respect to the high speed internal clock, some of the data streams appearing on signal taps 83*a* through 83*p* will be correctly clocked into respective registers 84*a* through 84*p* and some the data streams appearing on such signal taps will not be correctly clocked into the associated registers.

As indicated above, each of these state machine 86*a* through 86*p* produces an output which indicates whether the data appearing at the output of the respective register 84*a* through 84*p* matched the predetermined pattern transmitted by the respective transmitter during the alignment phase. The outputs from the state machines 86*a* through 86*p* are coupled to the inputs of the selection logic 90. The selection logic 90 is employed to select the most optimum delayed version of the data stream or a near optimum version of the delayed data stream if no single optimum delayed data stream can be selected. The selected data stream will either not be delayed at all or will be delayed some fraction of a bit time. More specifically, the final result of this process is the selection of a delayed version of the serial high speed data stream which has the data window centered with respect to the high speed internal clock.

In another embodiment of the constant phase crossbar switch operative in accordance with the present invention, the output registers 60*a* through 60*n* are integrated with the crossconnect 58 and the configuration register 59 to achieve higher packaging density. The operation of the embodiment depicted in FIG. 5 is as described as with respect to FIG. 4. It should be appreciated that further integration of components of the constant phase crossbar 50 may be achieved without departing from the inventive concepts described herein. For example, the input logic circuits 56*a* through 56*n* may also be integrated in one or more application specific integrated circuits (ASICs) along with the crossconnect 58, the configuration registers 59, the phase locked loop 68 and the registers 60*a* to 60*n* to achieve further increased levels of integration.

The process of aligning the input data phase within the input logic circuits 56*a* through 56*n* is controlled by an ALIGN signal 74. The ALIGN signal is coupled to the transmitters 52*a* through 52*n* to indicate that the transmitters should commence transmission of the predetermined alignment pattern. The ALIGN signal 74 is also provided as an input to the state machines 86*a* through 86*p* within each input logic block 56*a* through 56*n*. This allows the system to control when and how frequently to perform the phase alignment function. Since each input has its own phase selection function logic, the need to reacquire data phase alignment is independent of how often the input-to-output interconnect matrix is reconfigured.

Figure 7:
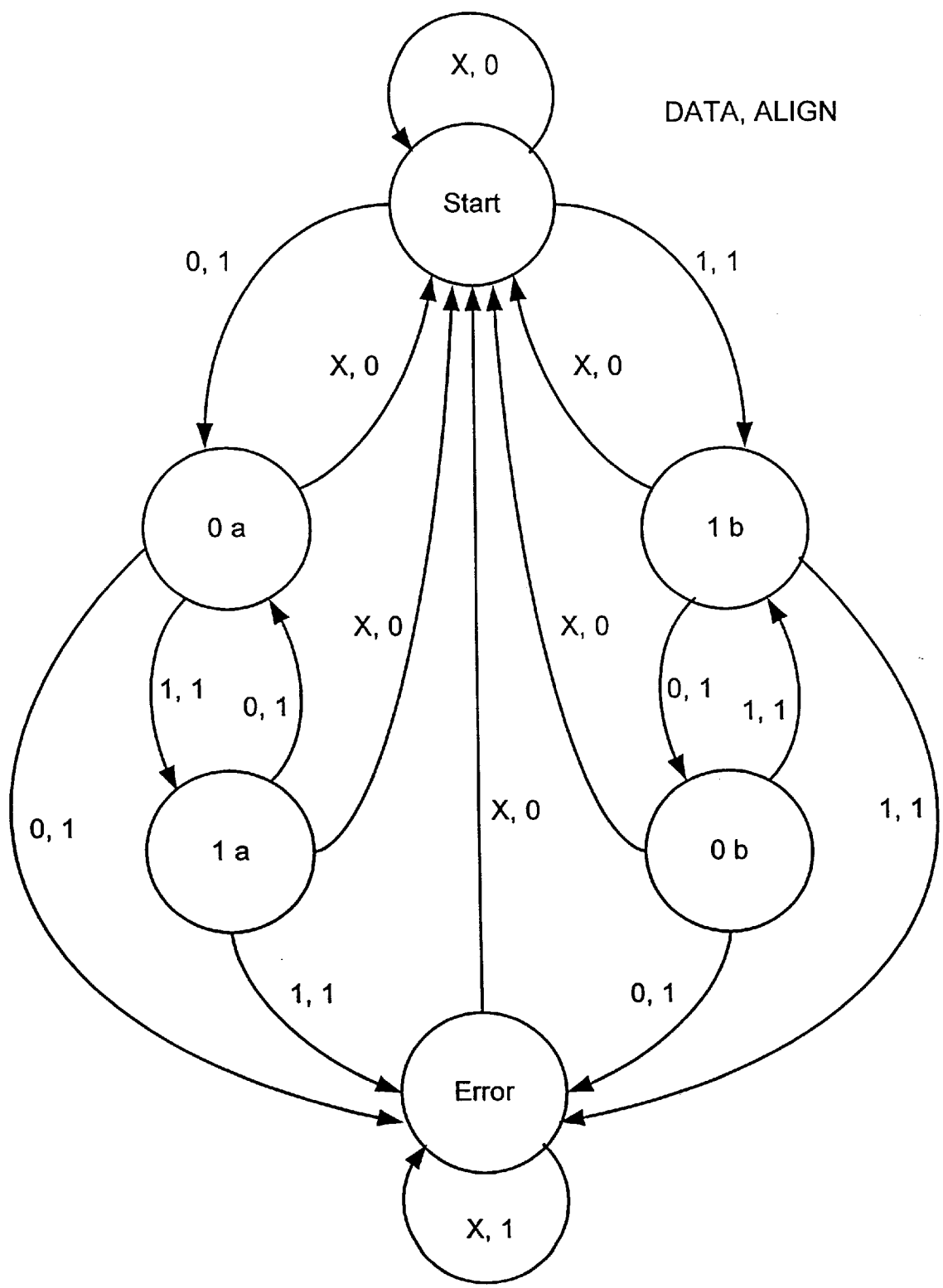
FIG. 7 is a state diagram illustrating the operation of the state machine depicted in FIG. 5.

Each of the state machines 86 associated with an input hunts for the predetermined pattern transmitted by the corresponding transmitter when ALIGN is asserted. This pattern can consist of a number of physically consecutive bits of the data stream or it can be a pattern obtained by sampling the data stream a fixed number of bits apart. The predetermined pattern may also comprises a bit sequence of alternating 1's and 0's, for example 10–50 alternating 1s and 0s. The state machine operation depicted in FIG. 7 implements this function. Referring to FIG. 7, when ALIGN is asserted, the state machine is in the Start state and will detect either a 0 or a 1 as the initial value from the corresponding input register 84. Assuming the first value detected following the assertion of ALIGN is a 0, the state machine transitions to state 0a. If the next value detected is a 1, the state machine transitions to state 1a. If 0s and 1s continue to be received in sequence, the state machine circulates between states 0a and 1a as shown. If the data is mis-sampled resulting in two 0s or two 1s in sequence, the state machine enters the Error state. Operation is similar in the event the first data sampled yields a 1. However, in the state machine implementation illustrated in FIG. 7, the state machine circulates between states 1b and 0b while correctly receiving the alternating pattern.

ALIGN is only asserted at a time when the respective transmitter is known to be transmitting the predetermined pattern. After a predetermined interval following the assertion of the ALIGN signal, the ALIGN signal is deasserted to signal each state machine to check its local version of the delayed data stream for the valid predetermined sequence (e.g. the alternating 1 and 0 sequence). If at any point the state machines detects a error in the data stream sequence, the state machine will stop in the Error state and assert an error signal to the selection logic 90. The state machine remains in the Error state until ALIGN has been deasserted. It should be noted that the number of states in the state machine is independent of the size of the bit sequence to be matched in the presently described embodiment. This is controlled by the duration of the assertion of the ALIGN.

Upon the de-assertion of the ALIGN signal, each of the state machines will have produced an output indicating whether the predetermined data pattern was or was not correctly received and forwarded a signal indicating such information to the selection logic 90. For example, assuming that the un-delayed version of the input signal and seven additional delayed versions of the input signal are applied to state machines 86a through 86h, the outputs of such state machines are applied to the selection logic 90 upon the deassertion of the ALIGN signal 74. If state machine 86a is viewing the non-delayed version of the input signal and state machine 86h is viewing the most delayed version of the input signal an exemplary input data pattern, for purposes of discussion and illustration, might appear as depicted in Table 1 below:

TABLE 1

| State Machine | State Machine Output |
|---|---|
| 86a | 0 |
| 86b | 0 |
| 86c | 1 |
| 86d | 1 |
| 86e | 1 |
| 86f | 0 |
| 869 | 0 |
| 86h | 0 |

A "1" indication in the second column of Table 1 indicates that the respective state machine correctly received the predetermined pattern transmitted during the assertion of the ALIGN signal 74. A "0" indication in the second column Table 1 indicates that the respective state machine did not correctly receive the predetermined pattern transmitted during the assertion of the ALIGN signal 74.

One state machine may be provided to analyze the data from each of the input registers 84a through 84p. Such state machines may be replicated for each of the input data streams to the constant phase crossbar switch. For example, in a 16×16 crossbar switch system in which a seven tap delay line is employed, eight state machines per input may be used; one for monitoring the register coupled to the non-delayed version of the data stream and seven state machines for monitoring each of the input registers 84 receiving the delayed versions of the input data stream. Thus, 128 state machines 86 would be employed in the present illustrative example.

To reduce the number of state machines needed, a single set of state machines may be multiplexed across the input logic blocks 56 rather than replicating the state machines in each of the input blocks. When multiplexing the state machines across the plurality of input logic blocks 56, the ALIGN signal is asserted sequentially for each of the input logic blocks to derive the phase adjusted version of the input data stream to employ for each of the data streams received at the respective inputs of the constant phase crossbar switch system.

Alternatively, in another embodiment, a single state machine 86 which is first multiplexed across each of the input registers 84 within one input logic block 56 and the results of the state machine analysis are conveyed to the selection logic sequentially until the data streams emanating from each of the registers 84 within an input logic block 56 have been analyzed. The interim results are stored within the selection logic 90 and the selection logic 90 finally selects the version of the data stream to be coupled to the crossbar switch 58 after all versions of the data stream emanating from the respective registers 84 have been inspected. The single state machine is then employed to analyze the data emanating from the input registers in another one of the plurality of input logic blocks. This process is repeated until a delayed (from 0 delay to 1 bit time) version of the input data stream is selected for each of the received data streams coupled to the inputs of the crossbar switch system 50.

In response to the de-assertion of the ALIGN signal 74, the selection logic analyzes the received data from the state machines and selects one of the delayed versions of the input signal to be employed as the active signal during the operational phase of the constant phase crossbar switch subsequent to the alignment phase. In the-above identified example, the Selection Logic would select the signal emanating from register 83d since state machine 86d appears to represent the phase alignment in which the high speed internal clock is most likely centered on the data window for the high speed serial data stream. More specifically, upon selection of one of the versions of the high speed data stream (either non-delayed or delayed some fraction of a bit time) the selection logic 90 controls the multiplexer 88 to forward the selected signal as the output from the multiplexer to the input of the register 92, which register is clocked using the high speed internal clock 69.

It will be appreciated that as a result of the alignment technique described above, it is not necessary to use a preamble at the beginning of a cell in the manner shown in FIG. 2. If the preamble is in fact omitted, the bandwidth efficiency of the switch is increased accordingly. However, it may be advantageous to retain the preamble for other reasons, such as for example backward compatibility considerations.

Over time, the phase of the high speed serial data stream may shift with respect to the high speed internal clock due to wander between the transmitter's phase locked loop and the phase locked loop 68 within the constant phase crossbar system. Accordingly, under system control, from time to time, the alignment process may be repeated. Such may be performed periodically, based upon error indications detected within respective data streams or based upon any other suitable activation criteria.

The multitap delay line 82 has a total delay equal to approximately one bit time, and consists of a number of generally equally spaced taps. More taps result in finer granularity in selecting the center of the data window. An 8 tap delay line allows for approximately 12.5% bit time granularity. A 16 tap delay line will yield approximately a 6.25% bit time granularity. Although more taps result in more accurate adjustment it also increases the amount of state machine logic and the complexity of the phase selector.

The delay line may be implemented as a dynamically scalable delay line in which the delay period per delay element decreases with increasing frequency. If logic elements are simply cascaded together to generate the desired delay, the result is a fixed or static delay per delay element. Such would limit the constant phase crossbar to operate within a fairly narrow frequency band. Alternatively, the delay line may be dynamically scaled such that the overall delay of the delay line matches the period of the internal high speed clock 69. Such an implementation allows the presently disclosed constant phase crossbar switch system to be employed over a much wider range of system clock frequencies. Additionally, dynamic scaling of the delay line results in more uniform spacing of the sample points across the data "eye".

Figure 8:
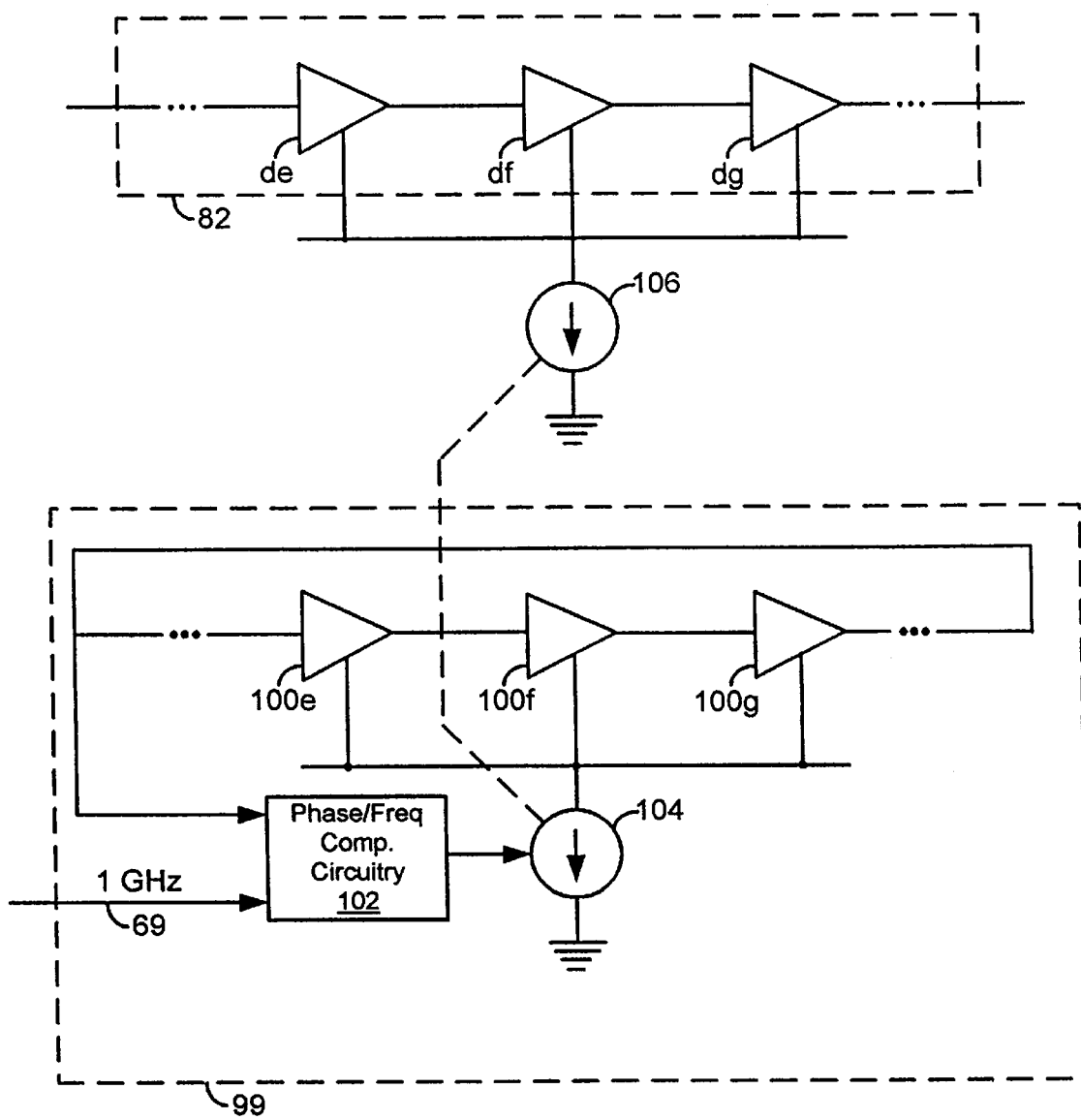
FIG. 8 is a schematic diagram of a circuit for adjusting the delay of a delay line used in the input logic of FIG. 5 to enable the constant phase crossbar system to operate at different frequencies.

FIG. 8 shows a possible implementation of a dynamically scaled delay line. The illustrated technique employs emitter-coupled logic (ECL), which has the desirable property that the delay through a logic element can be modified by adjusting the element's bias current. This property is exploited as follows. A phase-locked loop (PLL) 99 includes a ring oscillator consisting of a set of cascaded logic elements 100b, . . . , 100e, 100f, 100g, . . . 100p, for which the nominal total delay is equal to a bit time of the high speed internal clock. The elements 100x in the ring oscillator are of the same number and type as the delay elements dx in the delay line 82, and a logic inversion exists in the loop so that oscillation occurs. Phase and frequency comparison circuitry 102 within the PLL 99 receives the ring oscillator signal and the 1 GHz clock 69, and the output of the comparison circuitry 102 controls an adjustable current source 104 that provides the bias current for the ring oscillator elements 100x. The PLL 99 establishes the bias current such that the period of the ring oscillator matches the period of the 1 GHz clock 69. As indicated by the dotted line in FIG. 8, the ring oscillator bias current is mirrored to a second current source 106 that provides operating current for the elements db, . . . , de, df, dg, . . . , dp of the delay line 82. This current mirroring causes the total delay through the delay line 82 to be substantially equal to the delay through the ring oscillator elements 100b, . . . , 100p, which by the above-described mechanism is controlled to be a bit time. Thus as desired the delay to each element dx in the delay line 82 is a corresponding fraction of a bit time.

It will be appreciated by those of ordinary skill in the art that variations of and modification to the above described constant phase crossbar switch system and methods for employing the same may be made without departing from the inventive concepts and methods disclosed herein. Accordingly, the embodiments and illustrations provided herein should be viewed as exemplary, rather than limiting, and the invention should be viewed as limited solely by the scope and spirit of the appended claims.

What is claimed is:

1. A constant phase crossbar switch system having a plurality of switch system inputs and outputs, comprising:

a crossbar switch having a plurality of inputs and a plurality of outputs, said crossbar switch being operative to selectively couple a serial data stream appearing on at least one of said plurality inputs to at least one of said outputs, wherein said serial data stream is clocked at a predetermined frequency;

at least one input logic circuit, said at least one input logic circuit having an input for receiving a serial data stream from a corresponding transmitter transmitting said data stream at a specified frequency for receipt at one of said switch system inputs, said input logic circuit also having an output in electrical communication with one of said inputs of said crossbar switch, said at least one input logic circuit receiving as an input an internal clock having a clocking edge and running at said specified frequency, said at least one input logic circuit including a multitap delay line having an input and a plurality of delay line outputs, said serial data stream being coupled to said input of said multitap delay line, said multitap delay line being operative to generate increasingly delayed versions of said serial data stream at successive ones of said delay line outputs, said input logic circuit being operative to select a delayed version of said serial data stream from one of the delay line outputs for application to said one input of said crossbar switch.

2. The constant phase crossbar switch system of claim 1 wherein said at least one input logic circuit further comprises:

a plurality of input registers, each of said input registers having a data input, a data output, and a clock input, the data input of each input register being coupled to a corresponding one of said plurality of delay line outputs, the clock input of each input register being coupled to the internal clock to be loaded in response to the clocking edge thereof;

one or more state machines operative to monitor the outputs of the input registers during an alignment operation during which a predetermined data pattern appears in the serial data stream, the one or more state machines also being operative to provide an indication for each input register whether the predetermined data pattern is correctly detected at the output of the input register during the alignment operation; and selection logic operative in response to the indications from the one or more state machines to select the serial data stream from a selected one of the input registers to be provided to the crossbar switch, the selected serial data stream being the one of the serial data streams having a data valid window most centered on the clocking edge of the internal clock.

3. The constant phase crossbar switch system of claim 2, wherein each of said input registers comprises a D flip-flop.

4. The constant phase crossbar switch system of claim 1 wherein said multitap delay line comprises a plurality of logic elements cascaded in series.

5. The constant phase crossbar switch system of claim 4, wherein the logic elements of the multitap delay line are configured to have a bias current provided thereto to control the delay thereof, and further comprising:

a current-controlled ring oscillator circuit operative to generate an oscillator signal, the period of the oscillator signal at a given operating current being substantially equal to the total delay of the multitap delay line at the same operating current;

a first variable current source coupled to the current-controlled oscillator circuit to provide a first operating current thereto, thereby establishing the oscillation frequency thereof;

a second variable current source coupled to the logic elements of the multi-tap delay line, the second variable current source being operative to provide a second operating current to the logic elements thereby establishing the per-tap delay of the multi-tap delay line, the second variable current source being operatively coupled to the first variable current source such that the second current is substantially equal to the first current; and phase comparison circuitry operative in response to the oscillator signal and the internal clock of the switch to control the magnitude of the first current generated by the first variable current source such that the frequency of the oscillator signal is substantially equal to the frequency of the internal clock.

6. A method of transferring a serial data stream from a transmitter to a receiver in a crossbar switch, the transmitter and receiver both employing an internal clock to accomplish the data transfer, the method comprising the steps of:

during an alignment operation, performing the steps of:
(i) transmitting a predetermined alignment pattern in the serial data stream;
(ii) generating a plurality of phase-delayed replicas of the serial data stream;
(iii) sampling each phase-delayed replica of the serial data stream with the internal clock over a plurality of cycles of the predetermined pattern;
(iv) monitoring the sequences of samples of the phase-delayed replicas to indicate for each sequence whether the predetermined pattern is correctly detected therein throughout the plurality of cycles of sampling; and
(v) based on the indications for each sampled sequence, selecting one of the phase-delayed replicas of the data stream to be transmitted to the receiver, the selected replica being the replica having a data valid window most centered on the clocking edge of the internal clock; and subsequent to the alignment operation, transmitting the selected phase-delayed replica from the transmitter to the receiver.

7. A method according to claim 6, wherein the predetermined alignment pattern is a pattern of alternating logic ones and logic zeros, and wherein the step of monitoring the sequence of samples of each phase-delayed replica comprises the steps of:

in a first operational state of the switch, determining whether a logic low has been detected in the sequence;

if a logic low has been detected in the sequence during the first operational state, then transitioning to a second operational state indicative of the detection of the logic low;

if a logic low has not been detected in the sequence during the first operational state, then transitioning to a third operational state indicating that the predetermined pattern was not detected;

in the second operational state, determining whether a logic high has been detected in the sequence;

if a logic high has been detected in the sequence during the second operational state, then transitioning to the first operational state; and if a logic high has not been detected in the sequence during the second operational state, then transitioning to the third operational state.

8. A method of operating a crossbar switch having a plurality of inputs and outputs, comprising the steps of:

during a pre-operational state, performing an alignment operation operative to substantially phase align a plurality of serial data streams being transmitted from transmitters to receivers through a switching element of the switch, thereby generating respective operational data streams at the inputs of the switch; and during an operational state, selectively forwarding the respective operational data streams from the inputs of the switch to selected ones of the outputs of the switch, wherein during the pre-operational state each data stream comprises a predetermined preamble data pattern used by each receiver to phase-lock receiver operation with a received data stream.

9. The method according to claim 8, wherein the forwarding step includes the sub-step of re-configuring connections between the transmitters and the receivers in the switching element without re-transmission of the preamble data pattern.

* * * * *

UNITED STATES PATENT AND TRADEMARK OFFICE
CERTIFICATE OF CORRECTION

PATENT NO. : 6,208,667 B1  
DATED : March 27, 2001  
INVENTOR(S) : Stephen A. Caldara et al.

Page 1 of 1

It is certified that error appears in the above-identified patent and that said Letters Patent is hereby corrected as shown below:

Title page,
Item [75], Inventors, "Micheal" should read -- Michael --;

Column 1,
Line 58, "tootle" should read -- to the --;

Column 9, Table 1,
Line 58, "869" should read -- 86g --; and

Column 10,
Line 45, "the-above" should read -- the above --.

Signed and Sealed this

Second Day of April, 2002

Attest:

Attesting Officer

JAMES E. ROGAN
Director of the United States Patent and Trademark Office